United States Patent [19]

Levinson et al.

[11] Patent Number: 4,659,554
[45] Date of Patent: Apr. 21, 1987

[54] LOW-ENERGY PROCESS FOR SEPARATION OF HYDROGEN ISOTOPES

[75] Inventors: Samuel Levinson, North Brunswick; George G. Libowitz, Brookside; Arnulf J. Maeland, Succasunna, all of N.J.

[73] Assignee: Allied Corporation, Morris Township, Morris County, N.J.

[21] Appl. No.: 617,001

[22] Filed: Jun. 4, 1984

[51] Int. Cl.$^4$ .................. B01D 59/33; C01B 4/00; C01B 6/24
[52] U.S. Cl. ..................... 423/249; 423/648 A
[58] Field of Search .............. 423/249, 648 A, 648 R, 423/644, 645

[56] References Cited

U.S. PATENT DOCUMENTS

| | | | |
|---|---|---|---|
| 2,780,526 | 2/1957 | Fleck | 423/648 R X |
| 3,711,601 | 1/1971 | Reilly, Jr. et al. | 423/648 |
| 3,839,537 | 10/1974 | Charles et al. | 423/263 |
| 4,075,312 | 2/1978 | Tanaka et al. | 423/648 |
| 4,178,987 | 12/1979 | Bowman et al. | 165/1 |
| 4,360,505 | 11/1982 | Sheridan, III et al. | 423/248 |

FOREIGN PATENT DOCUMENTS 0067439  6/1982  European Pat. Off. ........ 423/249 X

OTHER PUBLICATIONS

W. P. Bebbington et al., *Chem. Eng. Prog.*, vol. 55, No. 9, 1959, pp. 70-78, ". . . Production of Heavy Water".
*Advances in Chemistry*, James F. Lynch et al., vol. 167, 1978, pp. 342-365, "The Titanium-Molybdenum-Hydrogen System: Isotope Effects, Thermodynamics, and Phase Changes".
R. H. Wiswall et al., *Inorganic Chemistry*, vol. 11, pp. 1961 et seq. (1972) "Inverse Hydrogen Isotope Effects in Some Metal Hydride Systems".
*Chemical Engineering Handbook*, John H. Perry, editor, 4th edition, McGraw Hill, N.Y., 1963—Sections 16-20 to 16-23, 20-15 to 20-42 and 20-42 to 20-54.
H. Kehde et al., *Chemical Engineering Process*, vol. 44 (No. 8) pp. 575-582 (Aug. 1948) "Ethylene Recovery".
*Chemical Engineering*, Dec. 1950, pp. 106-111, "Evolution of a Process".
*Chemical Engineering*, May 1953, pp. 219-231, "Fluidized Solids".

Primary Examiner—John F. Terapane
Assistant Examiner—Virginia B. Caress
Attorney, Agent, or Firm—Gus T. Hampilos; Gerhard H. Fuchs

[57] ABSTRACT

A process and apparatus are described for separating heavy isotopes of hydrogen. The process uses multiple protium-deuterium, protium-tritium or deuterium-tritium exchange reactions between a metal protide and gaseous hydrogen alternately depleted and enriched in at least one heavy isotope of hydrogen. The apparatus for performing the process comprises two multistage reaction zones, one for forming a metal hydride enriched in at least one heavy isotope and one for converting the enriched hydride to a depleted hydride and enriched hydrogen gas. The apparatus is simple in design and the process is much less energy intensive than existing prior art processes.

11 Claims, 1 Drawing Figure

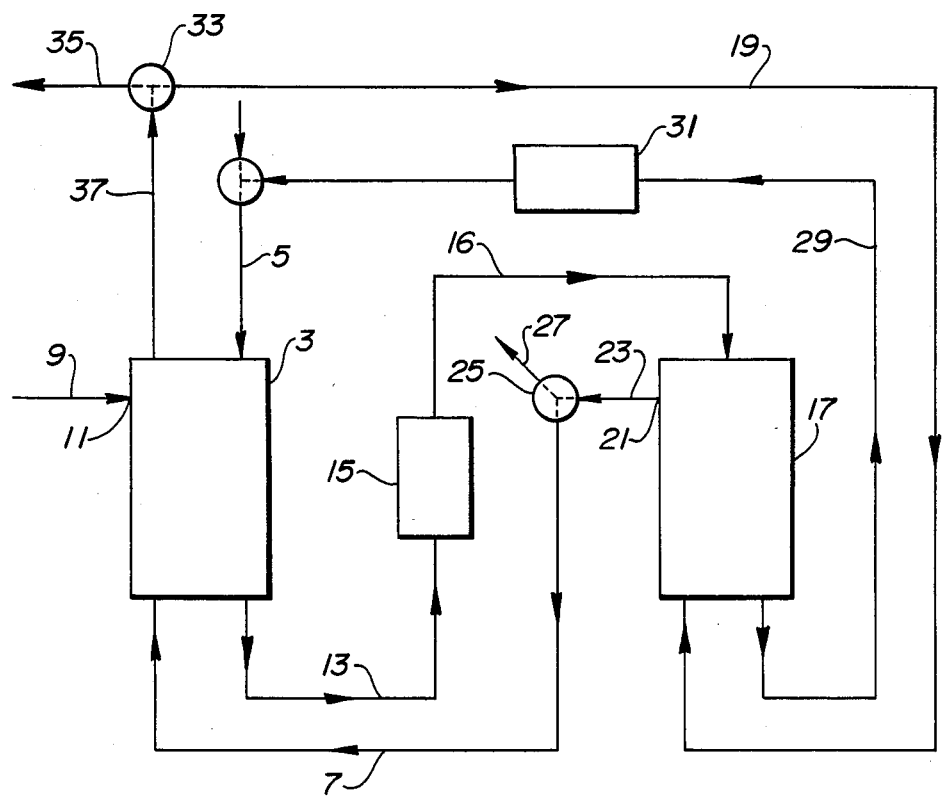

LOW-ENERGY PROCESS FOR SEPARATION OF HYDROGEN ISOTOPES

DESCRIPTION

Background of the Invention

This invention relates to a process for enriching hydrogen with at least one heavy isotope of hydrogen by using multiple protium-deuterium, protium-tritium or deuterium-tritium exchange reactions between a metal protide, especially a metal alloy protide formed from a solid solution metal alloy having a body-centered cubic structure, contained in a moving bed and gaseous hydrogen alternately depleted in and enriched in at least one heavy isotope of hydrogen.

The tritium (T) and deuterium (D) isotopes of hydrogen (H) hold great interest to workers in the field of nuclear energy. In the case of nuclear fission reactors, deuterium, which appears in hydrogen in nature at a concentration of 0.0156 mole percent (one part in 6410, the natural abundance), serves as a moderator in certain nuclear reactions. The presence of tritium in the hydrogen component of effluents from fission reactors and in fuel reprocessing plants requires careful handling, since tritium, which only occurs in trace amounts (< than 1 ppm), has a radioactive halflife of about 12 years. In the case of fusion reactors and tokamaks or other "magnetic bottles" having utility in applications requiring high temperature plasmas, tritium and/or deuterium comprise suitable fuels.

The term normal hydrogen or hydrogen (H) as used herein is defined as the naturally occurring mixture of hydrogen isotopes having an atomic number of one. Deuterium (D) and tritium (T) are referred to as the heavy isotopes of hydrogen, and protium (P) is referred to as the light isotope of hydrogen. Additionally, the term metal as used herein is intended to include metals and metal alloys. Furthermore, the term metal hydride includes metal dihydrides and metal monohydrides.

The enrichment of normal hydrogen (H) with its heavy isotopes for separation, recovery or control of the latter is usually achieved by the electrolysis of water or by the so-called GS process (W. P. Bebbington et al., *Chem. Eng. Prog.* Vol. 55, No. 9, 1959, pp. 70–78) wherein hydrogen-deuterium exchange occurs between water and hydrogen sulfide.

U.S. Pat. No. 3,711,601 (J. J. Reilly et al.) discloses a method of recovering deuterium and tritium from normal hydrogen comprising: absorption of the hydrogen by solid vanadium which produces solid vanadium hydride; separation of the gaseous and solid phases; desorption of part or all of the hydrogen isotopes in the solid phase, such as by heating the solid to a temperature sufficient to cause the decomposition of same; and, collection of the separated gases. Similar absorption/desorption processes are disclosed in U.S. Pat. No. 4,075,312 (J. Tanaka et al.) which uses various binary titanium alloys; in U.S. Pat. No. 3,839,537 (R. J. Charles et al.) which uses various transition metal-rare earth intermetallic compounds in a five stage cascade separator; and, in *Advances in Chemistry*, Vol. 167, (1978), pp. 342–365 (J. F. Lynch et al.) which uses the titanium-molybdenum system.

U.S. Pat. No. 4,178,987 (Bowman et al.) discloses moving bed hydride heat pumps, pressure pumps or hydrogen purification systems wherein hydride-forming material is transported between two reaction zones. In the first reaction zone, heat is supplied at a first temperature to effect desorption of hydrogen from the metal hydride. The partially or fully dehydrided material so formed is then transported to a second reaction zone wherein heat is drawn off at a second reaction zone wherein heat is drawn off at a second temperature to promote absorption of hydrogen.

U.S. Pat. No. 4,360,505 (J. J. Sheridan et al.) discloses absorption/desorption processes for recovering hydrogen from mixed gas streams. By contacting a gaseous mixture containing hydrogen with an intimate composite of a hydridable material such as $LaNi_5$ and inert ballast such as sintered nickel under conditions of increasing temperature and pressure, the intimate composite will absorb hydrogen. Desorption of hydrogen from the hydrided intimate composite occurs by reducing the pressure and utilizing the heat of hydride formation to aid in desorption.

However, the prior art processes of which we are aware and which employ metal hydrides for hydrogen purification or for enrichment of a gaseous hydrogen stream with heavy hydrogen isotopes operate by use of one or more absorption (association) desorption (dissociation) cycles which are energy intensive and, as such, uneconomical.

Most metal-hydrogen systems exhibit the so-called normal isotope effect near room temperature where the protide is more stable than the deuteride which is, in turn, more stable than the tritide. However, R. H. Wiswall et al., in *Inorganic Chemistry*, Volume 11, p. 1691 et seq. (1972), disclose inverse isotope effects in various metal hydride systems, such as $VH_2, NbH_2, (V,Nb)H_2$ and $LaNi_5H_6$, where the deuteride and tritide are more stable compounds (i.e., compounds having a lower dissociation pressure) than the protide near room temperature. We have discovered that metals exhibiting the inverse isotope effect can be used in a novel exchange process which economically recovers isotopes of hydrogen from hydrogen gas.

SUMMARY OF THE INVENTION

The present invention provides a process of enriching hydrogen with at least one heavy hydrogen isotope, comprising the steps of:

(a) counter-currently contacting, in a first multistage reaction zone, a metal hydride substantially free of deuterium and tritium with a gas comprising protium and at least one of deuterium and tritium, wherein said gas is comprised of (1) a first gaseous component comprising protium and the natural abundance of deuterium and tritium and (2) a second gaseous component comprising protium and greater than the natural abundance of at least one of deuterium and tritium, for a time sufficient to produce a metal hydride comprising protium and at least one of deuterium and tritium above about an amount which would be produced by reaction with normal hydrogen, and a resulting gas comprising protium and less than about the natural abundance of at least one of deuterium and tritium by maintaining, in said first reaction zone during contacting, a temperature whereat said metal protide is less stable than the metal deuteride and the metal tritide;

(b) transferring said metal hydride enriched in at least one of deuterium and tritium from said first reaction zone to a second multistage reaction zone, said metal hydride in said second reaction zone being at a temperature whereat the metal protide is more stable than the metal deuteride and the metal tritide;

(c) counter-currently contacting, in said second multistage reaction zone, said metal hydride enriched in at least one of deuterium and tritium with a gas comprising protium and less than about the natural abundance of deuterium and tritium for a time sufficient to produce a metal hydride substantially free of deuterium and tritium, and a gas comprising protium and greater than about the natural abundance of at least one of deuterium and tritium by maintaining, in said second reaction zone during contacting, a temperature whereat said metal protide is more stable than the metal deuteride and metal tritide;

(d) transferring said metal hydride substantially free of deuterium and tritium from the second multistage reaction zone to the first multistage reaction zone;

(e) withdrawing the gas comprising protium and greater than about the natural abundance of at least one of deuterium and tritium from said second reaction zone, and recovering at least a portion of the gas comprising protium and greater than the natural abundance of at least one of deuterium and tritium.

An additional feature of the present invention is the step of transferring a portion of the gas comprising protium and greater than about the natural abundance of at least one of deuterium and tritium from the record reaction zone to the first reaction zone to function as the second gaseous component.

In a preferred embodiment, the present invention employs as the metal a solid solution metal alloy having a body-centered cubic structure. Of particular importance are solid solution metal alloys of $Nb_xV_{1-x}$ where $0.4 \leq x < 1$, $Nb_xV_{1-x-y}Ti_y$ where $0.4 \leq x \leq 0.7$ and $0.1 \leq y \leq 0.3$, $V_{1-x}Fe_x$ where $0.05 \leq x < 1$ and $(V_{1-x}Ti_x)_{1-y}Fe_y$ where $0.01 \leq x \leq 0.6$ and $0.01 < y \leq 0.2$.

BRIEF DESCRIPTION OF THE FIGURE

The FIGURE schematically illustrates a preferred embodiment of the present invention for the separation of deuterium and/or tritium from hydrogen.

DETAILED DESCRIPTION OF THE INVENTION

The process of the present invention employs multiple protium-deuterium and protium-tritium exchange reactions in at least two multistage reaction zones. In the first multistage reaction zone, a moving bed comprising a metal hydride, preferably formed from a solid solution metal alloy having a body-centered cubic structure, substantially free of metal deuteride and metal tritide, is counter-currently contacted with a gas comprising protium enriched in deuterium and/or tritium for a time sufficient to produce a metal hydride comprising protium and at least one of deuterium and tritium above about an amount which would be produced by reaction with normal hydrogen, and a gas comprising protium and less than the natural abundance of deuterium and/or tritium. The temperature in the first reaction zone is maintained so that the metal protide is less stable than the metal deuteride or metal tritide. The pressure in the first reaction zone is maintained substantially constant and at a pressure whereat neither the metal deuteride (or metal tritide) nor the metal protide dissociates. The metal hydride enriched in deuterium and/or tritium is then transported to a second multistage reaction zone with the enriched metal hydride in the second reaction zone being at a temperature whereat the metal deuteride and/or metal tritide is less stable than the metal protide and a pressure whereat at least the metal protide does not dissociate. In the second reaction zone, the enriched metal hydride is contacted with a protium-rich gas for a time sufficient to exchange the deuterium and/or tritium with the protium. The resulting deuterium and/or tritium enriched gas is then withdrawn from the second reaction zone and at least a portion of the gas is processed to separate the heavy isotopes of hydrogen (as for example, $D_2O$ or $T_2O$).

The temperature in the first multistage reaction zone of the at least two multistage reaction zones is normally lower than the temperature in the second multistage reaction zone. It is preferred that each multistage reaction zone be operated isothermally. Additionally, it is a special feature of the present invention that all stages of each multistage reaction zone may be operated nearly isobarically, i.e., the pressure in all stages of each multistage reaction zone is substantially constant and substantially the same.

Among the metals useful in the process of the present invention are the Group VB elements vanadium, niobium and tantalum. Among the metal alloys found useful in the present invention are the solid solution metal alloys having the body-centered cubic structure, such as $Nb_xV_{1-x}$ and $(Nb_xV_{1-x})_{1-y}Fe_y$, wherein $0.4 \leq x < 1$ and wherein $0.01 \leq y \leq 0.15$, as disclosed in U.S. Pat. No. 4,425,318, as well as $Ti_{1-a}Mo_a$ and $(Ti_{1-a}Mo_a)_{1-b}M_b$ wherein M is a metal such as Al, Co, N, and Fe and wherein $0.25 \leq a \leq 0.75$ and wherein b is a non-zero number up to the solubility limit of M in the body-centered cubic solid solution alloy as disclosed in U.S. patent application Ser. No. 490,599, filed May 2, 1983, and also $V_{1-x}Fe_x$ where $0.05 \leq x < 1$ and $(V_{1-x}Ti_x)_{1-x}Fe_y$ where $0.01 \leq x \leq 0.6$ and $0.01 < y \leq 0.2$. In addition to the metal alloys mentioned, ternary body-centered cubic alloy systems, such as $(Nb_xV_{1-x})_{1-y}Ti_y$, where $0.4 \leq x \leq 0.7$ and $0.1 \leq y \leq 0.3$, are particularly useful because the addition of Ti tends to significantly reduce operating pressures of the process.

The metals and metal alloys (especially the solid solution metal alloys having the body-centered cubic structure) found useful in the process of the present invention exhibit the following characteristics:

(1) an inverse separation factor whereby the metal alloy protide is less stable than the corresponding deuteride (which is less stable, in turn, than the corresponding tritide) below a certain temperature $T_1$; and, conversely, the protide is more stable than either the corresponding deuteride and tritide at a temperature above $T_1$; and (2) a rate of P/D and P/T exchange which is fast at temperatures both above and below $T_1$. $T_1$ represents what is known as the crossover temperature for a given alloy system.

The term "separation factor (S.F.)" as used herein is defined as the ratio:

$$S.F. = \frac{R_s/H_s}{R_g/H_g} \approx \frac{(P_p)^{\frac{1}{2}}}{(P_{D/T})^{\frac{1}{2}}}$$

wherein $R_s$ is the concentration of the hydrogen heavy isotope in the solid phase, $H_s$ is the concentration of the protium in the solid phase; $R_g$ is the concentration of heavy isotope in the gas phase; $H_g$ is the concentration of the protium in the gas phase; $P_p =$ the dissociation pressure of protide; and, $P_{D/T}$=the dissociation pressure of deuteride or tritide.

The value of the ratio is different for each metal at a specific temperature. For P/D and/or P/T exchange in accordance with the present invention, the useful metals exhibit an S.F. which is greater than 1 at temperatures below $T_1$. More specifically, under substantially the same conditions, the $Nb_xV_{1-x}$ solid solutions alloys have higher separation factors for separating deuterium and/or tritium from hydrogen and faster exchange reaction rates than the separation factors and exchange rates for Nb, V or Ta alone and, therefore, are especially useful. For a typical alloy $Nb_xV_{1-x}$ where x=0.7 and 1−x=0.3, the S.F. of D from hydrogen is 1.97 versus 1.15 for Nb and 1.67 for V at 30° C.

The first and second multistage reaction zones of the present invention may be equipment of any convenient design useful for containing moving beds, such as those described in *Chemical Engineering Handbook,* John H. Perry, editor, 4th Edition, McGraw Hill, New York, 1963, at Sections 16-20 to 16-23, Section 20-15 to Section 20-42 and Section 20-42 to Section 20-54; in "*Chemical Engineering Progress*", Volume 44 (No. 8) pages 575-582 (August 1948); in *Chemical Engineering,* December 1950, pages 106-111; and in *Chemical Engineering,* May 1953, pages 219-231. The moving bed equipment wherein solids are moved by gravity are preferred. The hypersorption unit disclosed in *Chemical Engineering Progress,* Volume 44 (No. 8) at pages 575-582 is most preferred.

The present invention is better understood by referring to the FIGURE which is used, for example, for the separation of deuterium from hydrogen gas. A solid solution metal alloy protide, MAP, is introduced from line 5 into an upper portion of a first multistage reaction zone 3 to produce a moving bed of MAP. The operation and construction of the first multistage reaction zones 3 is analogous to an enriching section of a distillation column or the cooling portion of the hypersorption unit noted supra.

The slowly moving bed of MAP is counter-currently contacted with a gas comprising protium and deuterium. A first gaseous component of protium and a natural abundance of deuterium (about 0.015 mol %) is introduced via line 9 into the first reaction zone 3 at a location along the reaction zone (indicated generally at 11) where the composition of the metal alloy hydride within the reaction chamber is in equilibrium with the composition of the first gaseous component. The temperature is maintained in the reaction zone 3 (under nearly isobaric conditions, $P_1$) below $T_1$, whereat the stability of metal alloy deuteride, MAD, is greater than the stability of MAP. As metal alloy protide particles travel through the first multistage reaction zone 3, the metal alloy protide undergoes an exchange reaction whereby protium is replaced by deuterium in the alloy simultaneously with the depletion of the gas in D and enrichment in P. The resulting gas, now comprising protium and less than about the natural abundance of deuterium (normally less than about 0.001 mol % of D), is removed from the first reaction zone 3 via a line 37, a valve 33 and the lines 19 and 35. The resultant metal alloy hydride, enriched in deuterium by the exchange reaction, is removed from a lower portion of the reaction zone 3 via a line 13 and transferred by any convenient means to a heating zone 15 wherein the temperature is raised above about $T_1$ whereat the MAP is more stable than the MAD. The heated metal alloy hydride enriched in deuterium is transferred from the heating zone 15 via a line 16 to an upper portion of a second multistage reaction zone 17 (of a design equivalent to the stripping section of a distillation column or the heating portion of the hypersorption unit noted supra) to produce a moving bed of deuterium-enriched metal alloy hydride. The slowly moving bed of deuterium-rich hydride is counter-currently contacted with a gas comprising protium and less than the natural abundance of deuterium, such gas being introduced via a line 19 into a lower portion of the second reaction zone 17. The temperature in the second reaction zone 17 is maintained above about $T_1$ while the pressure is maintained at about the same nearly constant pressure $P_1$ as in the first reaction zone 3. In the second reaction zone 17, the deuterium concentration of the metal hydride is reduced to below about 0.002 mole %. A resultant gas comprising protium and more than about the natural abundance of deuterium (as much as about 5 to about 60 mol % of deuterium after a number of cycles of the process, normally about 20 mol % more) is removed from the second reaction zone 17 at an upper location 21 (indicated generally) via line 23. At least a portion of the deuterium-enriched gas removed from the second reaction zone 17 is withdrawn via valve 25 and line 27 for processing (e.g., conversion to heavy water). The remainder of the deuterium-enriched gas is recycled via line 7 to the lower portion of first reaction zone 3. The metal alloy hydride in the second reaction zone 17, now substantially free of deuterium, is removed from the lower portion of the second reaction zone 17 via line 29 and forwarded to a cooling zone 31 wherein the temperature of the depleted hydride is lowered to a value below about $T_1$. The cooled deuterium-depleted metal alloy hydride is then removed from the coolant zone 31 and recycled into the reaction zone 3.

An example of our novel process is described herein for a vanadium niobium alloy ($V_{0.7}Nb_{0.3}$) exhibiting a crossover temperature equal to 154° C. (427° K.). This crossover temperature represents the temperature at which the S.F.=1. That is to say, when S.F.=1, protide-deuterium exchange and the deuteride-protium exchange are in equilibrium (the dissociation pressure of protide and deuteride are equal). Using the equation Rln $P=a(T)^{-1}-b$ where R=gas constant, P=the dissociation pressure of the metal hydride (atm), a=the enthalpy of formation of the hydride and b=the entropy of formation of the hydride, we have experimentally determined that for the $V_{0.7}Nb_{0.3}$ alloy dihydride:

$$\ln P_p = -\frac{4532.4}{T} + 15.43$$

and $$\ln P_o = -\frac{5954.6}{T} + 18.76$$

where $P_p$=the dissociation pressure of protide (atm) and $P_o$=the dissociation pressure of deuteride (atm).

TABLE 1

| T °C. | $P_p$ (atm) | $P_0$ (atm) | S.F. |
|---|---|---|---|
| 30 | 1.622 | 0.416 | 1.97 |
| 154 | 123 | 123 | 1.00 |
| 220 | 503 | 794 | 0.804 |

As demonstrated in Table 1, at 30° C. the pressure must be maintained above about 1.622 atm so that the metal remains saturated in protium and deuterium. The pressures at this temperature indicate that the deuteride is more stable than the protide; i.e., the pressure required to maintain deuteride stable is much less than the pressure in the chamber required to keep the protide stable. Therefore, the deuteride is more stable than the protide at 30° C. and an exchange reaction will take place wherein the metal protide will convert to metal deuteride in accordance with the general reaction:

$$2MP_2 + x(1+c)D_2 \rightarrow 2MP_{2-x}D_x + 2xcPD + x(1-c)P_2$$

where $$c = \left[\frac{K}{4+K}\right]^{\frac{1}{2}}$$

about 0.67 at room temperature to about 0.70 at 500° C. and, K (equal to about 3.3 at room temperature to about 3.8 at 500° C.) is the equilibrium constant between PD,D$_2$ and P$_2$ from P$_2$+D$_2$=2PD and is written as $$K = \frac{[PD]^2}{[P_2][D_2]}.$$

At 154° C., the dissociation pressure of deuteride and protides are equal. At above about 123 atm, neither deuteride nor protide dissociates. However, regardless of the pressure employed at this temperature the system is in equilibrium.

At 220° C., the dissociation pressure of deuteride is significantly higher than that of protide. Therefore, the protide is far more stable than the deuteride and an exchange reaction will take place between the metal deuteride and proceeds to convert it to metal protide. In accordance with the invention, the pressure is maintained at least about 503 atm so that at least the protide does not dissociate and the exchange occurs according to the general reaction:

$$2MP_{2-x}D_x + x(1+c)P_2 \rightarrow 2MP_2 + 2xcPD + x(1-c)D_2$$

Based upon these calculations the process would operate at 30° C. and at least about 503 atm in the first reaction chamber 3 and at about 220° C. and at least 503 atm in the second reaction chamber 17.

In order to reduce the operating pressure of the system, the vanadium-niobium alloy can be modified to include titanium. The expected results of alloying with titanium are described with reference to Table 2 and Table 3.

TABLE 2

| T °C. | (V$_{0.54}$Nb$_{0.36}$Ti$_{0.2}$) | P$_0$ (atm) | S.F. |
|---|---|---|---|
| 30 | 0.400 | 0.103 | 1.97 |
| 154 | 46.2 | 46.2 | 1.00 |
| 180 | 89.0 | 109 | 0.91 |
| 220 | 224 | 347 | 0.80 |

TABLE 3

| T °C. | (V$_{0.42}$Nb$_{0.28}$Ti$_{0.3}$) | P$_0$ (atm) | S.F. |
|---|---|---|---|
| 30 | .162 | .042 | 1.96 |
| 154 | 24.2 | 24.2 | 1.00 |
| 180 | 48.9 | 59.3 | 0.91 |
| 220 | 124.7 | 194.9 | 0.80 |

The effect of the addition of Ti is to reduce the plateau (dissociation) pressure (a known value for each metal hydride) in the exchange reaction involving a metal alloy dihydride. A reduction in the plateau pressure corresponds to an increase in the absolute enthalpy of the system (i.e., making the value more negative). This increase should be substantially the same for each of the protide and the deuteride. Since the entropy of the protide and deuteride remains constant, the crossover temperature of the ternary niobium-vanadium-titanium alloys will remain essentially unchanged. As illustrated by TABLE 2, a 10 wt % Ti addition should reduce the operating pressure of the system to at least 224 atm. This represents about a 60% reduction in operating pressure as a result of a 10 wt % addition of Ti. A more pronounced reduction in operating pressure is observed from the results shown in TABLE 3 for a 30 wt % addition of Ti. The 30 wt % addition of Ti should reduce the operating pressure of the system to at least 125 atm.

Further operating pressure reductions can be obtained by changing from the dihydride exchange reaction to be monohydride exchange reaction. A substantial reduction in operating pressures will occur due to the increased stability of the monohydride [i.e., the monohydride exhibits a lower plateau (dissociation) pressure]. The general reactions which govern the monohydride exchange reaction are:

$$2MP + x(1+c)D_2 \rightarrow 2MP_{1-x}D_x + 2xcPD + X(1-c)P_2 \quad (i)$$

and $$2MP_{1-x}D_x + x(1+c)P_2 \rightarrow 2MP + 2xcPD + x(1-c)D_2 \quad (ii)$$

where reaction (i) occurs when the deuteride is more stable than the protide and reaction (ii) occurs when the reverse is true.

Typically, reaction chamber 3 would be a cylinder approximately 11 m high with a diameter of about 0.5 m. The reaction chamber 3 should be equivalent in internal design with the cooling portion of the hypersorber unit discussed supra. Initially, the reaction chamber 3 is pressurized to the P$_1$ value for the alloy system being used and the temperature is maintained below T$_1$ such that the value of the separation factor is significantly greater than 1. To start up the system, metal hydride is added to the upper portion of the reaction chamber 3. To the metal hydride is added hydrogen. As the initial metal hydride passes through the cylinder, additional metal hydride is fed into the upper portion of the reaction chamber. As the metal hydride passes through the cylinder, it is enriched in deuterium and/or tritium. The enriched hydride is then removed from the reaction chamber 3 at a controlled rate. At the same time, protium enriched hydrogen is removed from the upper portion of the chamber with some being vented and some being fed into a lower portion of the second reaction chamber 17.

The second reaction chamber 17 would typically be about 14 m high with a diameter of about 0.125 m. As the enriched hydride travels along the cylinder, it is depleted in deuterium and/or tritium because the temperature is maintained above the $T_1$ temperature, which produces a value for the S. F. of less than 1. The heavy isotope-depleted metal hydride is removed from a lower portion of the second reaction chamber 17. Enriched hydrogen gas is removed from an upper portion of the second chamber. At this time, the enriched gas is transferred to the first reaction chamber and fed into the lower portion thereof. Some of the enriched gas is withdrawn from the system for further processing such as conversion into $D_2O$ and/or $T_2O$. The depleted metal hydride is then transferred to the first reaction chamber. At this stage of the process, the solid material within the system essentially operates within a closed loop.

As the system continues to cycle, the degree of enrichment of the hydrogen gas in deuterium and/or tritium increases due to the constant supply of hydrogen gas to the system. This enrichment is controlled by the amount of gas removed from the line 27 for further processing and by the basic process parameters. As noted heretofore, after a number of cycles the degree of enrichment can be between about 5 and 60 mol % deuterium and/or tritium.

From the discussions supra, it would be clear to one of ordinary skill in this art that the process for the separation of deuterium from tritium parallels the process steps outlined above. A determination of the values for the relationship $R\ln P = a(T)^{-1} - b$ can be made through experimentation which would be routine for one of ordinary skill in this art.

Having described our preferred embodiment in detail, it will be abundantly clear that a number of modifications and/or variations can be employed without departing from the scope of the invention defined by the appended claims.

We claim:

1. A process of enriching hydrogen with at least one heavy hydrogen isotope, comprising the steps of:
   (a) counter-currently contacting, in a first multistage reaction zone, a metal hydride exhibiting an inverse isotope effect and being substantially free of deuterium and tritium with a gas comprising protium and at least one of deuterium and tritium, wherein said gas is comprised of (1) a first gaseous component comprising protium and the natural abundance of deuterium and tritium and (2) a second gaseous component comprising protium and greater than the natural abundance of at least one of deuterium and tritium, for a time sufficient to product a metal hydride comprising protium and at least one of deuterium and tritium above about an amount which would be produced by reaction with normal hydrogen, and a resulting gas comprising protium and less than about the natural abundance of at least one of deuterium and tritium by maintaining, in said first reaction zone during contacting, a temperature whereat said metal protide is less stable than the metal deuteride and the metal tritide;
   (b) transferring said metal hydride enriched in at least one of deuterium and tritium from said first reaction zone to a seond multistage reaction zone, said metal hydride in said second reaction zone being at a temperature whereat the metal protide is more stable than the corresponding metal deuteride and the metal tritide;
   (c) counter-currently contacting, in said second multistage reaction zone, said metal hydride enriched in at least one of deuterium and tritium with a gas comprising protium and less than about the natural abundance of deuterium and tritium for a time sufficient to produce a metal hydride substantially free of deuterium and tritium and a gas comprising protium and greater than about the natural abundance of at least one of deuterium and tritium by maintaining, in said second reaction zone during contacting, a temperature whereat said metal protide is more stable than the metal deuteride and metal tritide;
   (d) transferring said metal hydride substantially free of deuterium and tritium from the second multistage reaction zone to the first multistage reaction zone;
   (e) withdrawing the gas comprising protium and greater than about the natural abundance of at least one of deuterium and tritium from said second reaction zone and recovering at least a portion of the gas comprising protium and greater than the natural abundance of at least one of deuterium and tritium.

2. The process of claim 1 wherein said first and second multistage reaction zones contain moving beds of metal hydride.

3. The process of claim 1 wherein the metal hydride is formed from a solid solution metal alloy having a body-centered cubic structure selected from the group consisting of: $Nb_xV_{1-x}$, $(Nb_xV_{1-x})_{1-y}Fe_y$, where $0.4 < x < 1$ and $0.01 < y < 0.15$; $(Nb_{1-x}V_x)_{1-y}Ti_y$ where $0.4 < x < 0.7$ and $0.1 < y < 0.3$; $(V_{1-x}Ti_x)_{1-y}Fe_y$ where $0.01 < x < 0.6$ and $0.1 < y < 0.2$; and, $V_{1-x}Fe_x$ where $0.05 < x1$.

4. The process of claim 1 wherein the remainder of the gaseous stream comprising protium and greater than about the natural abundance of tritium is removed, coverted into the corresponding oxides and separated into at least one of $D_2O$, and $T_2O$, and $H_2O$.

5. The process of claim 1 wherein a gas comprising protium and the natural abundance of deuterium and tritium is introduced into said first multistage reaction zone at a location where the concentration of protium, deuterium and tritium in the metal hydride is in equilibrium with the concentration of protium, deuterium and tritium in the gas.

6. The process of claim 1 further comprising the step of feeding the first and second gaseous components into the first reaction zone at different locations within the zone.

7. The process of claim 1 further comprising the step of transferring the resulting gas to the second reaction zone for counter-current contact with the enriched metal hydride.

8. The process of claim 1 further comprising the step of supplying, as the second gaseous component, at least a portion of the gas withdrawn from the second reaction zone.

9. The process of claim 7 further comprising the step of heating the resulting gas prior to feeding the resulting gas into the second reaction zone.

10. The process of claim 8 further comprising the step of cooling the withdrawn gas being supplied as the second gaseous component prior to feeding the withdrawn gas to the first reaction zone.

11. The process of claim 1 further comprising the steps of cooling the metal protide prior to feeding the metal protide into the first reaction zone and heating the enriched metal hydride prior to feeding the enriched metal hydride into the second reaction zone.

* * * * *

UNITED STATES PATENT AND TRADEMARK OFFICE
CERTIFICATE OF CORRECTION

PATENT NO. : 4,659,554
DATED : April 21, 1987
INVENTOR(S) : S. Levinson et al.

It is certified that error appears in the above-identified patent and that said Letters Patent is hereby corrected as shown below:

Col. 2, line 4: Delete "reaction".

line 5: Delete "zone wherein heat is drawn off at a second".

Col. 7, line 57: "$(V_{0.54}Nb_{0.36}Ti_{0.2})$" should read -- $(V_{0.54}Nb_{0.36}Ti_{0.1})$ --.

Col. 9, line 50: "product" should read -- produce --.

Col. 10, line 32: "$0.05 < x\ 1$" should read -- $0.05 < x < 1$ --.

Signed and Sealed this

Tenth Day of November, 1987

Attest:

DONALD J. QUIGG

Attesting Officer

Commissioner of Patents and Trademarks